Nov. 6, 1934.　　　　T. J. SMULSKI　　　　1,979,713

RECORDING INSTRUMENT

Filed Oct. 4, 1930　　　　2 Sheets-Sheet 1

Inventor
Theodore J. Smulski
By Slough and Canfield
Attorneys

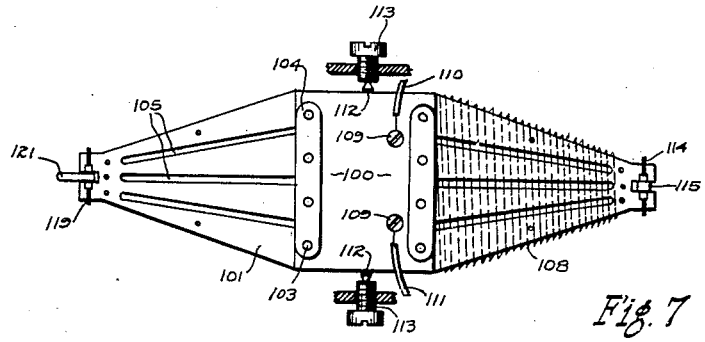
Fig. 7
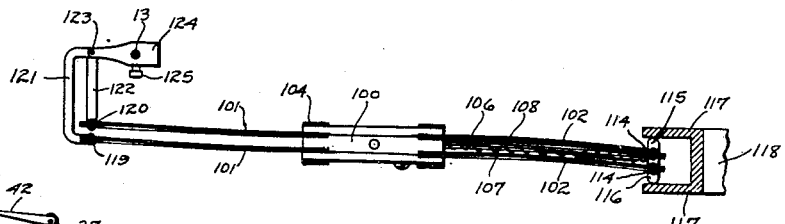
Fig. 6
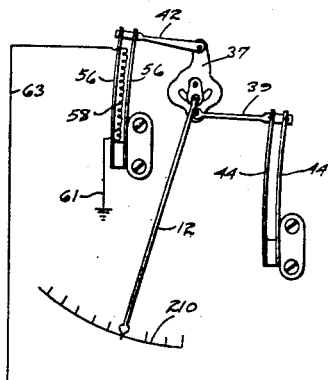
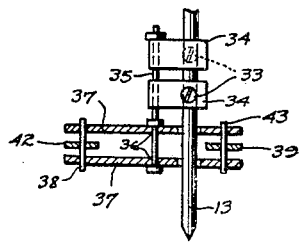
Fig. 5
Fig. 9
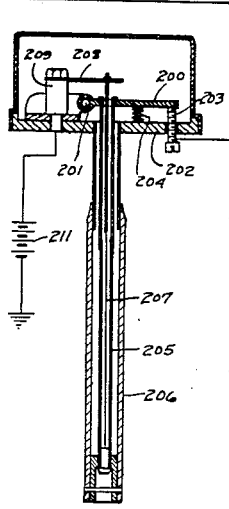
Fig. 10
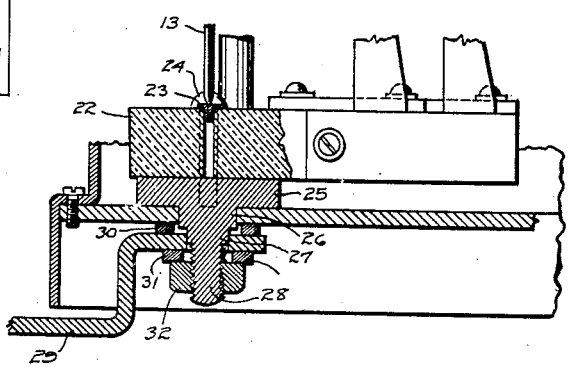
Fig. 8
INVENTOR.
Theodore J. Smulski
BY
Slough and Canfield
ATTORNEYS Patented Nov. 6, 1934

1,979,713

UNITED STATES PATENT OFFICE 1,979,713

RECORDING INSTRUMENT

Theodore J. Smulski, Gary, Ind., assignor to The Anderson Company, Gary, Ind., a corporation of Indiana Application October 4, 1930, Serial No. 486,415

24 Claims. (Cl. 171—271)

This invention relates to indicating and recording instruments, and particularly to such instruments of the electrically operated type.

It is one of the objects of this invention to provide an improved instrument of the class referred to adapted to indicate and/or record in an improved manner variations of a variable quantity such as temperature or the like, at a remotely situated station.

Another object is to provide an instrument of the class referred to adapted to be operated by a thermo-responsive device, the temperature of which is caused to vary by an electric current transmitted from a remotely situated station and varying in accordance with variations of a variable quantity such as temperature or the like.

Another object is to provide an instrument of the class referred to adapted to respond to impulses of electric current transmitted from a remotely situated control station, the impulses of current varying in duration in response to variations of a variable quantity, such as temperature or the like at the said station.

Another object is to provide an instrument of the class referred to adapted to be electrically actuated in accordance with varying rates of transmission of electrical energy thereto from a remotely situated station.

Another object is to provide an improved instrument of the class referred to particularly adaptable for use in connection with an electrical controller or transmitter of the type adapted to send out over an electric circuit a series of current impulses varying in duration in accordance with variations of a variable quantity, such as temperature or the like.

Another object of my invention is to provide an improved thermo-responsive actuator for instruments of the class referred to.

Another object is to provide an improved thermo-responsive actuator for instruments of the class referred to adapted to respond to varying amounts of heat energy transmitted thereto from a remotely situated control station.

Another object is to provide an improved mounting for the indicating and/or recording needle of an instrument of the class referred to.

Another object is to provide an improved mounting for the indicating and/or recording needle of an instrument of the class referred to particularly adaptable to use in connection with a thermo-responsive device and adapted to magnify movements of the device in an improved manner.

Another object is to provide in instruments of the class referred to an improved thermo-responsive actuator compensated in an improved manner for changes of local temperature and adapted to transmit to an indicating and/or recording needle of the instrument magnified movements in response to changes of temperature impressed thereupon by electric current transmitted thereto from a remotely controlled station.

Other objects of my invention will be apparent to those skilled in the art to which my invention pertains.

My invention is fully described in the following description taken in connection with the accompanying drawings, in which:—

Fig. 5 is a fragmentary, partly elevational, partly sectional view taken from the plane 5 of Fig. 3;

Fig. 6 is a view generally similar to Fig. 3, but showing a modification;

Fig. 7 is a bottom plan view of the parts of Fig. 6;

Fig. 8 is a fragmentary view similar to a part of Fig. 1 but showing in cross-section parts which, in Fig. 1, are shown in elevation;

Fig. 9 is a view to a larger scale of one of the elements of Fig. 3 shown separately;

Fig. 10 is a diagrammatic view, illustrating in simplified form the embodiment of my invention of Figs. 1 to 5 inclusive and associated with a controller of the thermo-responsive type.

Figure 2:
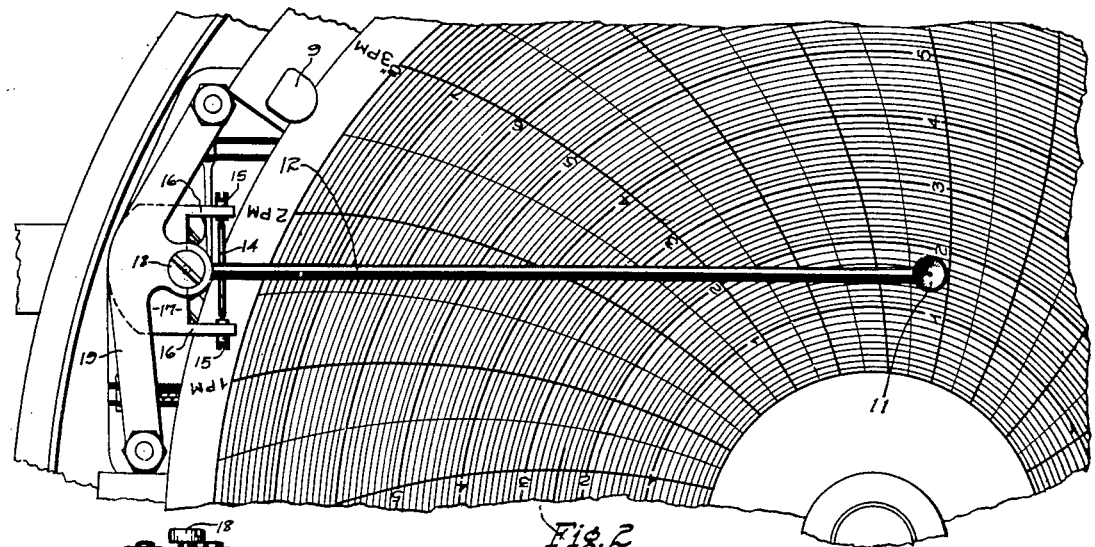
Fig. 2 is a top plan view of the parts of Fig. 1.

Referring to the drawings, I have shown at 1 the main base of the instrument embodying my invention and mounted centrally thereon a housing 2 within which is contained spring or motor driven clockwork mechanism for rotating at a constant and relatively slow speed, a shaft 3 one end of which is seen projecting from the housing 2. The shaft 3 has a shoulder 4 thereon beyond which the shaft is threaded to receive a clamping nut 5. Between the nut 5 and shoulder 4 a circular chart of paper or the like 6 is clamped and thereby adapted to rotate with the shaft 3. The chart 6 is supported so as to maintain its flat or planular form by platen 7 of thin sheet metal supported on the base 1 by suitable columns 8, one of which is shown. Tongues 9 on the platen 7 overlap the peripheral edge of the chart 6 to guide the movement of the same in a well known manner.

A reservoir pen 10 comprising an ink reservoir 11 and an arm 12 is mounted to swing in the plane of the chart 6 about the axis of a vertically disposed shaft 13, the pen arm 12 being secured at its outer end to a horizontal shaft 14 the outer ends of which are pivoted in adjustable bearings 15—15 screw-threaded into the bifurcations 16—16 of a head 17 secured to the shaft 13.

Figure 4:
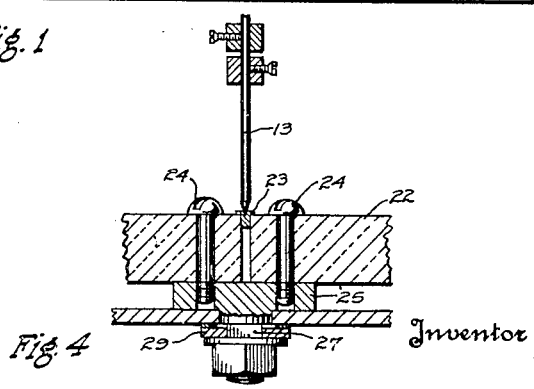
Fig. 4 is a fragmentary sectional view taken from the plane 4 of Fig. 1.

The upper end of the shaft 13 has a pivot bearing in an adjustable screw 18 threaded into a plate 19 which is supported at its ends upon posts 20—20 screw-threaded on their lower ends as at 21 into a panel of insulating material 22 to be more fully described. The lower end of the shaft 13 is similarly pivoted in a pivot bearing 23, Figs. 4 and 8, seated in a suitable recess in the panel 22.

Figure 3:
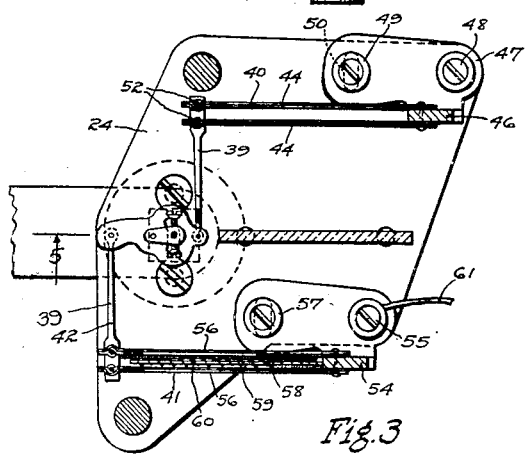
Fig. 3 is a sectional view taken approximately from the plane 3 of Fig. 1 with parts omitted for simplicity.

The panel 22 is preferably formed from insulating material, of sufficient thickness to permit of threading screws directly thereinto and of the generally horizontal plan indicated in Fig. 3. The panel 22 is generally horizontally disposed and is secured by screws 24 to the circular head 25 of a panel adjusting element comprising a central circular shank 26 depending from the head 25 and rotatable in a bearing aperture in the base 1, the shank 26 below the base 1 being formed to rectangular cross-section as at 27 and terminating in screw threads 28. A lever 29 has a corresponding rectangular perforation telescoped with the rectangular portion 27. By means of a washer 30, lock washer 31 and nut 32, the lever is clamped onto the rectangular portion 27 and the head 25 is securely mounted on the base 1. Upon moving the lever 29, the head 25 may be rotated and will, in a manner which will now be understood, adjustably rotate the panel 22 and the posts 20 and needle 10 mounted thereon, and the point of the reservoir pen 11 may thus be caused to take up any desired datum position on the chart 6. The bearing 26 in the base 1 is preferably coaxial with the shaft 13, so that upon adjusting the position of the pen radially on the chart 6, its position circumferentially thereon will not be disturbed.

Mounted upon the panel 22 is a thermo-responsive actuator for the needle 10, the thermoresponsive element thereof responding to variations of electric current supplied thereto in a manner which will later be referred to. These parts will now be described.

Secured to the shaft 13 as by set screws 33—33 is a pair of bearing supports 34—34 rotatably supporting in aligned bores thereof a shaft 35, having rotational connections at 36—36 with a pair of spaced links 37—37 on opposite sides of the bearing 36, and spaced equally therefrom and in a line therewith are bearing connections 38—38 to which are connected connecting rods 39—39 disposed generally at right angles to the line of the bearings 38—36—38. The connecting rods 39 are connected at their outer end to thermo-responsive devices 40 and 41 to be described. The connecting rods 39 are adapted to be moved longitudinally by the thermo-responsive devices 40 and 41, and when their movements are equal, the link 37 is rotated thereby around the bearing 36 and no movement is communicated to the shaft 35 and shaft 13. However, if for operative reasons to be described, one of the connecting rods 39 such as that indicated by the reference character 42, is given a greater longitudinal movement than the other connecting rod, the link 37 will have a resultant rotary movement around the bearing 43, and this movement of the link 37 will bodily move the shaft 35 laterally causing it to move with it the bearing supports 34—34, giving to the shaft 13 a rotary movement around its longitudinal axis, which movement is in turn transmitted to the needle 10, causing the reservoir pen 11 to move in an arc over the chart 6.

Figure 1:
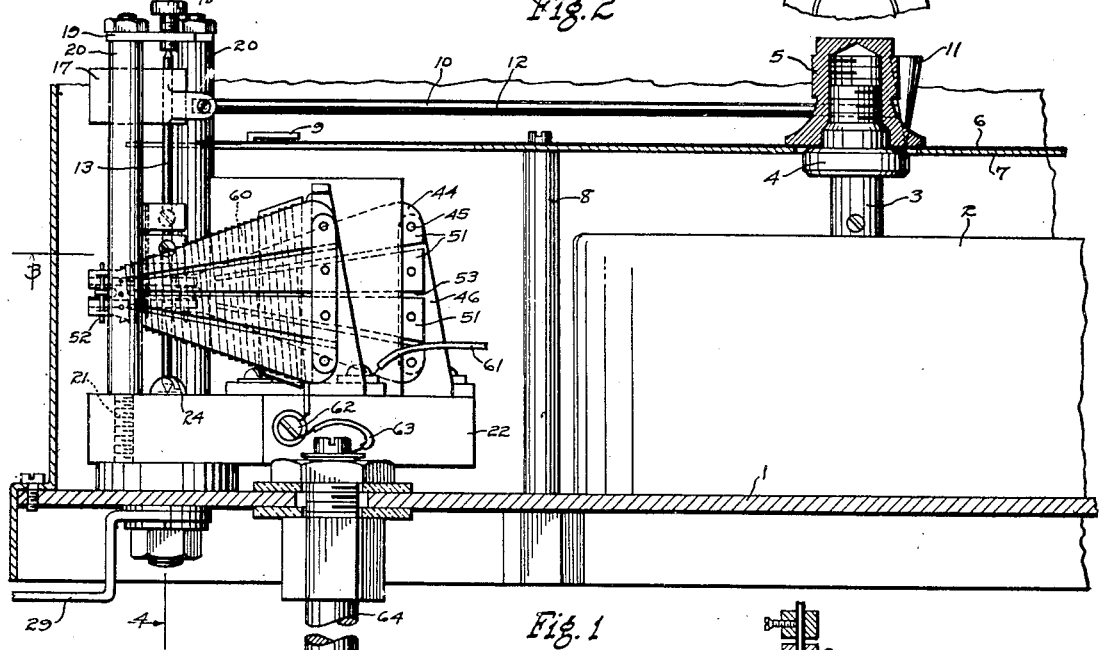
Fig. 1 is a cross-sectional partly elevational fragmentary view of an instrument embodying my invention.

The thermo-responsive device 40 comprises a pair of bi-metallic elements 44—44 generally of triangular form disposed in vertical planes as viewed in Fig. 1 and suitably spaced apart. At one end the bi-metallic elements 44—44 are secured as by rivets 45 upon opposite sides of a vertically disposed support 46 having a horizontally disposed flange 47 by which it is secured to the panel 22.

The preferred securing means comprises a screw 48 extending through a suitable perforation in the flange 47 and threaded into the panel 22, and a screw 49 similarly threaded into the panel 22 but extending through an elongated perforation 50 in the flange 47 whereby the flange 47 and the thermo-responsive device 40 as a whole may be adjustably rotated around the screw 48 in a well known manner. Each of the bi-metallic elements 44 may if preferred comprise a plurality of separate leaves 51, four of which are shown in the drawings. The outer or free ends of the bi-metallic elements 44—44 are secured to the connecting rod 39, the preferred form of connection comprising a pair of pins 52—52 secured to the ends of the bi-metallic elements and passing through suitable perforations in the connecting rod 39. By this construction, both elements 44 rod 39 may transmit their movement to the connecting rod 39, and in either direction.

The bi-metallic elements 44 are preferably so formed that the connection with the connecting rod 39 is at the apex of the triangular form thereof and the base of the triangle is secured to the support 46. Each bi-metallic element 44 may be made from a single sheet of bi-metallic material, and the leaves 51 may be formed by cutting slots 53 therein. By this construction, a mechanically strong bi-metallic element is produced and at the same time sensitively thermo-responsive to changes of temperature.

The thermo-responsive device 41 may be constructed exactly like the device 40, comprising bimetallic elements 56—56 secured to a support 54 and the latter secured to the panel 22 by screws 55 and 57.

The thermo-responsive device 41 is additionally provided with a heating winding 58 disposed generally between the bi-metallic elements 56—56 and comprising generally a planular support 59 upon which is wound a heating wire 60. One end of the wire 60 is preferably grounded to the support 54 and a circuit wire 61 therefor is connected to the screw 55. The other terminal of the wire 60 is secured to a screw 62 on the panel 22 and a circuit wire 63 therefrom is connected to an external connection post 64 supported on and insulated from the base 1 in any suitable manner. The connection between the connecting rod 42 and the elements 56—56 may be the same as that described for the connecting rod 39.

The circuit wire 61 may be connected to an external connection post similar to the post 64 so that a source of current for heating the heating element 58 may be connected thereto externally of the instrument.

The bi-metallic elements 44—44 and 56—56 are adapted to bend in response to changes of temperature in the well known manner of bi-metallic material of this class, and the two devices 40 and 41 are selectively disposed so that upon, say, an increase of temperature, the device 40 will exert a pull on the connecting rod 39, and the device 41 will correspondingly exert a pull on the connecting rod 42, both pulls tending to rotate the link 37 counter-clockwise, as viewed in Figs. 3 and 9, about the bearing 36. The device 40 is subjected only to changes of local or ambient temperature and the device 41 is subjected to both ambient temperature and to temperature of the heating element 58. The device 40 compensates the device 41 for changes of ambient temperature. Movement of the device in response to temperature given thereto by the heating element 58, is thus transmitted to the link 37 to rotate the shaft 13 and move the needle 10 independently of any changes of ambient or local temperature.

It will now be clear that by the construction above described, I have provided an instrument, the indicating and/or recording needle 10 of which moves to indicate by its position or to record by an ink line on the chart 6, variations of the temperature of the thermo-responsive device 41, and inasmuch as the latter is heated electrically, the indication or record will be responsive to changes of electrical energy supplied thereto.

It will thus appear that my instrument is adapted for use in any case where it is desired to indicate or record variations of an electric current regardless of the cause of the variations of current.

The instrument of my invention is particularly useful where it is desired to indicate or record variations of some variable quantity such as temperature or the like at a remotely situated station and in connection with apparatus, such as a controller, by which the variations of said quantity such as temperature or the like are translated into variations of an electric current.

One such controller is illustrated and described in my copending application Serial No. 486,414 filed of even date herewith and in Fig. 10 of the drawings herein, this controller has been illustrated in simplified diagrammatic form in connection with a diagrammatic representation of the instrument hereinbefore described and the electric circuit connecting the controller and the instrument.

Referring to Fig. 10, a switch arm 200 pivoted at 201 to a stationary base 202 contactingly engages a contact 203. The arm 200 is held in closed position against the force of a spring 204 by a tube 205 connected to the arm at its upper end, and at its lower end connected to the lower end of an outer tube 206, the upper end of which is secured to the base 202. The tubes 205 and 206 are longitudinally thermally expansible. A heating wire 207 within the tube 205 is electrically connected to the lower end thereof and its upper end connected to a spring 208 whereby the wire is kept taut and the spring 208 as a conductor connects to a terminal post 209.

In the upper part of Fig. 10, the needle 12 of the instrument is shown associated with a scale 210. A pair of bi-metallic elements 44—44 and a pair of bi-metallic elements 56—56, the latter pair being provided with a heating element 58, connect by means of connecting rods 39 and 42 with the link 37, and effect movement of the needle 12 in response to the amount of heat energy supplied by the element 58 as set forth more completely hereinbefore in connection with the other figures of the drawings, wherein like reference characters have been used to designate like parts of the instrument.

The controller referred to and indicated generally in the lower part of Fig. 10 operates as follows. Current from a suitable source such as a battery 211 flows through the post 209 into the heating wire 207, and by way of tube 205 to the switch arm 200, contact 203, and by wire 63 to the heating element 58 and wire 61, completing the circuit back to the source 211 by ground. The heating effect of the current in the wire 207 heats the tube 205 and expands it longitudinally, permitting the arm 200 to break contact at 203 and interrupt the current.

Thereupon the wire 207 cools down and the tube 205 contracts and again closes the contact at 203, thus sending out over the wire 63 a succession of current impulses. The tube 206 is subjected to the temperature which it is desired to indicate or record on the instrument, for example, the temperature of fluid in a conduit into which the tube 206 may be projected. In response to this temperature, the tube 206 expands longitudinally, carrying with it bodily the tube 205 and bending the arm 200, which for this purpose is preferably resilient. The greater the expansion of the tube 206, the greater will be the required expansion of the tube 205 to effect opening at the contact 203, and hence the greater the duration of the current flow in the wire 207 required to expand the tube 205, and hence the greater the duration of the impulse of current sent out by the controller. Thus the duration of the current impulses will be responsive to the temperature to which the tube 206 is subjected.

Thus at relatively low temperatures, the impulses are each relatively short and at higher temperatures are correspondingly longer. The operation of the instrument in response to said series of current impulses will now be described.

If the circuit over which such impulses are sent be connected to the circuit wires 61 and 63 hereinbefore described, the heating element 58 will be heated thereby. Because of well known principles of design of the device 41 including the inclosure of the heating element between a pair of bi-metallic elements 56 and including the construction of the heating element 58 with considerable mass, the device 41 as a whole will have a substantial amount of heat storage capacity or thermal inertia. Thus the temperature of the device 41 will become substantially constant or uniform although effected by an intermittent current or succession of current impulses. Therefore, in response to a series of impulses of given duration, a substantially constant temperature of the device 41 will be attained and the needle 10 will take up a corresponding position with respect to the chart 6. Upon a change of the length of the impulses sent out by the controller above referred to, the quantity of heat supplied to the device 41 will correspondingly change, resulting in a corresponding change of its temperature and corresponding change of position of the needle 10. Thus the needle 10 will indicate or record the changes of temperature at the source from which the impulses are sent out.

In Figs. 6 and 7 I have shown a modified form of the thermo-responsive device for rotating the shaft 13 to actuate the needle 10. At 100 is shown a head preferably built up of a plurality such as three layers of fiber or like material having suitable insulating properties.

Triangular - shaped  bi - metallic  elements

101—101 and 102—102 are secured to the head 100 at the triangle base preferably by inserting the bases between the outer and inner layers of the head 100 and projecting rivets 103 through the head and through the element. Reinforcing strips 104 to facilitate the riveting operating may be provided on the outer faces of the head 100.

The bi-metallic elements 101 and 102 are preferably of the same general construction as the corresponding elements of the other figures of the drawings and are preferably provided with slots 105—105 which divide up the triangular bi-metallic element into leaves or filaments. The bi-metallic material of the elements 101 and 102 tends to bend transversely as well as longitudinally and the provision of the slots 105 reduces the transverse bending to a negligible amount so that the tendency of the element to take up a channel form which would interfere with its longitudinal bending is negligible. Between the elements 102—102 is disposed a heating unit 106 comprising a base 107 upon which is wrapped a heating wire 108. The terminals of the wire 108 may be brought out to connection screws 109—109 to which external circuit wires 110 and 111 may be connected, these wires corresponding to the circuit wires 61 and 63 of the form shown in the other figures.

The head 100 is provided with a pair of pivot points 112—112 on opposite sides of the head to provide a rotational axis for the thermo-responsive actuator as a whole, the pivot points 112—112 being mounted in bearing supports 113—113, fragmentarily shown in Fig. 7 and which may be secured to the panel 22, shown in Fig. 1, by any suitable form of construction to support the actuator thereon. Preferably the axis of the pivot bearing 112—113 is vertically disposed on the panel 2.

The free ends of the bi-metallic elements 102—102 are provided with pins 114 therein, passing through suitable perforations in a link 115 disposed transversely of the bi-metallic element 102 and provided with rounded ends 116. The link 115 at its ends is embraced or engaged by the arms 117—117 of a bifurcated bracket 118 secured upon the panel 22.

The free ends of the bi-metallic elements 101—101 are similarly provided with pins 119 and 120. A U-shaped link 121 is pivoted to the pin 119 at the end of one of its legs. A straight link 122 is pivoted at one end to the pin 120 and the other end of the link 122 and the other leg of the link 121 are pivoted together at 123 to a head 124 secured by a set screw 125 to the shaft 13, above described. The links 121 and 122 have their pins and bearing connections 119, 120 and 123 substantially in a common line transversely disposed with respect to the longitudinal direction of the bi-metallic element 101.

In the operation of the actuator shown in Figs. 6 and 7, current is supplied to the wires 110 and 111 to heat the heating wire 108, causing it to heat the bi-metallic elements 102—102. These elements correspondingly bend and reacting through the link 115 upon the stationary bracket 118, rotate the head 100 through a small part of a revolution on its pivot bearings 112—113, and this rotational movement is communicated to the bi-metallic elements 101 and thence to the pins 119 and 120, links 121 and 122 to correspondingly rotate the head 124 and the shaft 13, the latter being connected as hereinbefore described to move the pen 10. The bi-metallic element 101 compensates the element 102 for changes of local or ambient temperature. A change of local temperature will bend the element 102 in one direction to rotate the head 100, tending to give movement to the element 101 and the shaft 13 as above described. But a corresponding bending of the element 101 will concurrently occur and the element 101 may be so disposed on the head 100 that their tendency to bend will occur in the direction to tend to move the shaft 13 in the opposite direction.

Thus the movement of the element 102 is exactly compensated by the movement of the element 101, and the shaft 13 remains unmoved by such changes of local temperature.

It will be understood that the indicating or recording instrument of my invention may be employed to indicate or record the variations of other variables than temperature. The controller illustrated in Fig. 10 and more completely described in my copending application of even date herewith, is particularly adapted to transmit a succession of current impulses of varying duration in response to changes of temperature, but my invention is equally applicable for use with controllers actuated by other variables than temperature such, for example, as pressure, velocity of flow of a fluid, etc. etc. My invention is also applicable to indicate and/or record variations of an electric current flowing continuously and not in impulses. The instrument of my invention may therefore be employed to indicate, register and/or record the variations of the variables effecting the variations of the continuously flowing current.

One of the advantages of the instrument of my invention resides in the improved construction of thermostatic device such as indicated generally at 40 or 41 in one form thereof, and in Figs. 6 and 7 in another form thereof. Referring to Fig. 3 for example, and to the device 40, it will be observed that the two bi-metallic elements 44—44 are disposed in substantially parallel relation and suitably spaced apart and stationarily secured at one end to the support 46. The elements 44—44 are alike or similar and tend to bend in the same direction upon the occurrence of temperature change.

The thin or bearing connection at 52 with the connecting rod 39 at two points on the connecting rod complete a mechanical construction which will be recognized as that of a parallelogram movement mechanism. The elements 44, although their movement on the support 46 is a hinging movement, nevertheless transmit movement to the connecting rod 39 substantially in the direction of its length, that is to say, the connecting rod 39 does not rotate bodily around the support 46.

My invention is not limited to the exact details of construction shown and described hereinbefore. Many changes in and modifications of the embodiment of my invention hereinbefore shown and described may be made without departing from the spirit thereof or sacrificing its advantages.

I claim:

1. In an instrument of the class described, a variably movable indicating element, comprising an oscillatory element, an oscillatory member supported by the element, a pair of thermostatic devices oppositely movable responsive to ambient temperature changes, connections from the devices to the oscillatory member adapted to transmit their movements thereto and to the oscillatory element, and whereby the devices may transmit opposing mutually neutralized moving efforts to the oscillatory member in response to changes of ambient temperature, an electric heating element for one of the devices rendering it independently movable in response to variations of heating effect of current therein to cause it to correspondingly variably move the oscillatory element and indicating element in response to variations of said current, each of said thermostatic devices comprising a bimetallic planular member generally triangular in form having connection at its apex with the oscillatory member.

2. In an instrument of the class described, a variably movable indicating element comprising an oscillatory shaft, an oscillatory element supported by the shaft, a pair of thermostatic devices movably responsive to ambient temperature changes, connections from the devices to the oscillatory element adapted to transmit their movements thereto to oscillate it and the shaft, and whereby the devices may transmit mutually neutralized oscillatory efforts to the oscillatory element in response to changes of ambient temperature, an electric heating element for one of the devices rendering it independently movable in response to variations of heating effect of electric current therein to cause it to correspondingly variably oscillate the oscillatory element and shaft in response to variations of said current, each of said thermostatic devices comprising a bimetallic planular member generally triangular in form having connection at its apex with the oscillatory member.

3. In an instrument of the class described, a variably movable indicating element comprising an oscillatable shaft, a pair of thermostatic devices movably responsive to ambient temperature changes, connections from the devices to the shaft adapted to transmit their movements thereto to oscillate the shaft, and whereby the devices may transmit mutually neutralized oscillatory efforts to the shaft in response to changes of ambient temperature, said connections comprising a link element having oscillatory bearing connection with the shaft on an axis eccentric to the axis of the shaft and a connecting element between each thermostatic element and the link adapted to communicate movement to the link at points on opposite sides of the link axis, a heating element for one of the devices rendering it independently movable in response to variations of heating effect thereof to cause it to correspondingly variably oscillate the shaft, each of said thermostatic devices comprising a bimetallic planular member generally triangular in form having connection at its apex with the oscillatable shaft.

4. In a thermo-responsive device, an oscillatably movable element, a thermostatic device for variably moving the movable element comprising a pair of bimetallic substantially rectilinear elements disposed in parallel relation one at each side of the axis of oscillation of the movable element, and each rigidly supported at one end, a pair of arms supported by the movable element extending laterally from opposite sides of the oscillation axis, connecting link elements pivotally connected to the free ends of the bimetallic elements and to the said arms, the bimetallic elements extending in the same direction from the rigidly supported ends and disposed in longitudinal offset relation whereby the link elements may extend from the bimetallic element free ends in right-angle relation thereto.

5. A thermo-responsive device as described in claim 4 and in which the bimetallic elements comprise each two parallel coextensive planar members both rigidly supported at homologous ends and each link element being pivotally connected to both of the free ends of the planar members, and extending therefrom substantially at a right angle.

6. In combination with a variably movable element, a thermostatic device connected to the element for variably moving it in response to temperature changes of the device, said device comprising a bi-metallic planular element generally triangular in form connected at its apex with the movable element and stationarily supported at its base and the bi-metallic metal being slitted in directions generally from apex to base to divide the same into a plurality of spaced jointly thermally responsive portions.

7. In a thermo-responsive instrument, a variably movable indicating element, a thermostatic device comprising an oscillatably mounted head, a pair of bi-metallic thermo-responsive elements rigidly connected at one end to the head and extending in different directions from the axis of oscillation, the free end of one element movably engaging a stationary support, the free end of the other element being connected to the movable indicating element, the said support engaging by-metallic element being adapted to rotate the head in response to changes of ambient temperature and in the direction to neutralize corresponding movement of the other bi-metallic element tending to move the indicating element.

8. In a thermo-responsive instrument, a variably movable indicating element, a thermostatic device comprising an oscillatably mounted head, a pair of bi-metallic thermo-responsive elements rigidly connected at one end to the head and extending in different directions from the axis of oscillation, the free end of one element movably engaging a stationary support, the free end of the other element being connected to the movable indicating element, the said support engaging bi-metallic element being adapted to rotate the head in response to changes of ambient temperature and in the direction to neutralize corresponding movement of the other bi-metallic element tending to move the indicating element, and a heating element for one of the bi-metallic elements rendering it independently movable in response to variations of heating effect thereof to cause it to correspondingly variably move the indicating element.

9. In a thermo-responsive instrument, a variably movable indicating element, a thermostatic device comprising an oscillatably mounted head, a pair of bi-metallic thermo-responsive elements rigidly connected at one end to the head and extending in different directions from the axis of oscillation, the free end of one element movably engaging a stationary support, the free end of the other element being connected to the movable indicating element, the said support engaging bi-metallic element being adapted to rotate the head in response to changes of ambient temperature and in the direction to neutralize corresponding movement of the other bi-metallic element tending to move the indicating element, and an electric heating element for one of the bi-metallic elements rendering it independently movable in response to variations of heating effect of varying current therein to cause it to correspondingly variably move the indicating element in response to variations of said current.

10. In a thermo-responsive instrument, a variably movable indicating element, a thermostatic device comprising an oscillatably mounted head, a plurality of thermo-responsive bi-metallic elements rigidly connected at one end to the head and extending from the oscillatory axis in one direction, and in substantially parallel spaced relation and at their free ends pivotally connected to a tie element, the tie element movably engaging a stationary support, a second pair of bi-metallic thermo-responsive elements rigidly connected at one end to the head and extending in another direction from said axis in substantially parallel spaced relation and at their free ends pivotally connected to a corresponding plurality of link elements, the link elements being pivotally connected to the movable indicating element, the support engaging bi-metallic element being adapted to rotate the head in response to changes of ambient temperature and in the direction to neutralize corresponding movement of the other bi-metallic element tending to move the indicating element, and an electric heating element disposed between the first-mentioned pair of bi-metallic elements for rendering them independently movable in response to variations of heating effect of current in the element to cause them to correspondingly variably move the indicating element by movement transmitted through the head and through the other pair of bi-metallic elements in response to variations of current in the heating element.

11. In a thermally actuable apparatus, an oscillatably movable element having an arm extending laterally from the oscillation axis, a thermostatic device comprising a pair of parallel rectilinear coextensive spaced bimetallic elements rigidly supported at one end, a link element pivotally connected to the free ends of both bimetallic elements and extending therefrom substantially at a right angle and at its other end pivotally connected to the arm.

12. In an instrument of the class described, a variably movable indicating element comprising an oscillatable shaft, a pair of thermostatic devices movably responsive to ambient temperature changes, connections from the devices to the shaft adapted to transmit their movements thereto to oscillate the shaft, and whereby the devices may transmit mutually neutralized oscillatory efforts to the shaft in response to changes of ambient temperature, said connections comprising a link element having oscillatory bearing connection with the shaft on an axis eccentric to the axis of the shaft and a connecting element between each thermostatic element and the link element adapted to communicate movement to the link at points on different sides of the link axis, a heating element for one of the devices rendering it independently movable in response to variations of heating effect thereof to cause it to correspondingly variably oscillate the shaft, each of said thermostatic devices comprising a bimetallic planular member generally triangular in form having connection at its apex with the oscillatable shaft.

13. The combination with a thermo-responsive instrument, comprising a main base, a reference scale on the base, a movable indicating element cooperating with the scale, a thermostatic device connected to the indicating element and responsive to temperature changes to correspondingly move the indicating element; of an auxiliary base supported on the main base, supporting the indicating element and thermostatic device and means to adjustably move the auxiliary base to adjustably position the indicating element with reference to the scale.

14. The combination with an indicating instrument, comprising a main base, a reference scale on the base, a movable indicating element cooperating with the scale, and oscillatably mounted to oscillate on an axis of oscillation, a thermostatic device connected to the movable element and responsive to temperature changes to correspondingly oscillate the element; of an auxiliary base supported on the main base, and supporting the indicating element and thermostatic device, and means to adjustably move the auxiliary base around the axis of oscillation to adjustably position the indicating element with reference to the scale.

15. The combination with an indicating instrument, comprising a main base, a reference scale on the base, a movable indicating element cooperating with the scale and oscillatable on an axis of oscillation, an electro-responsive device connected to the indicating element and responsive to changes of current therein to correspondingly oscillate the indicating element; of an auxiliary support on the main base, supporting the indicating element and electro-responsive device, and means to adjustably move the auxiliary support around the axis of oscillation to adjustably position the indicating element with reference to the scale.

16. In an indicating instrument, an indicating element oscillatably mounted, an oscillatory element supported on the indicating element, a pair of thermostatic devices adapted to move in response to changes of ambient temperature, connections from the devices to the oscillatory element whereby they may transmit their movement thereto and to the indicating element whereby the devices may have their moving efforts mutually neutralized in response to changes of ambient temperature only, a heating element for one of the devices rendering it independently movable in response to variations of heating effect thereof to cause it to correspondingly variably move the oscillatory element and indicating element, an electric circuit for heating the heating element, a remotely situated controller in the circuit adapted to cause electric current from a suitable source to flow over the circuit in impulses of varying duration to variably heat the heating element.

17. In an indicating instrument, comprising a reference scale, an indicating element associated with the scale oscillatably mounted and supporting an oscillatory element, a pair of thermostatic devices adapted to move in response to changes of ambient temperature, connections from the devices to the oscillatory element and indicating element whereby they may transmit their movement thereto and whereby the devices may have their moving efforts mutually neutralized in response to changes of ambient temperature only, a heating element for one of the devices rendering it independently movable in response to variations of heating effect thereof to cause it to correspondingly variably move the oscillatory element and indicating element, an electric circuit for heating the heating element, a remotely situated controller in the circuit adapted to cause electric current from a suitable source to flow over the circuit in impulses of varying duration to variably heat the heating element, the indicating element and thermostatic devices being supported on a base movable with respect to the scale and manually operable means for moving the base to position the indicating element with reference to the scale.

18. In combination with a variably movable indicating element, a thermostatic device connected to the element for variably moving it in response to temperature changes of the device, said thermostatic device comprising an oscillatably mounted head, a pair of thermo-responsive elements rigidly connected at one end to the head and extending in different directions from the axis of oscillation, the free end of one element movably engaging a stationary support, the free end of the other element being connected to the movable indicating element, the said support engaging bimetallic element being adapted to rotate the head in response to changes of ambient temperature and in the direction to neutralize corresponding movement of the other bimetallic element tending to move the indicating element, each of said elements comprising a bimetallic planular member generally triangular in form having the movable connection therewith at its apex and being secured at its base to said oscillatably mounted head.

19. In an indicating instrument, an indicating member mounted to oscillate about an axis, an element associated with said indicating member and adapted to oscillate with said member and to oscillate relative to said member, a pair of thermostatic devices adapted to move in response to changes of temperature, connections between said thermostatic devices and said element whereby moving effort by both of said thermostatic devices oscillates said element relative to said indicating member and whereby moving effort by one of said thermostatic devices operates to oscillate said indicating member on its axis.

20. In an indicating instrument, an indicating member mounted to oscillate about an axis, an element associated with said indicating member and adapted to oscillate with said indicating member and to oscillate on an axis spaced from the axis of said indicating member, a pair of thermostatic devices adapted to move in response to changes of temperature, connections between said thermostatic devices and the said element whereby moving effort by both of said thermostatic devices operates to oscillate said element relative to said indicating member and whereby moving effort by one of said thermostatic devices operates to oscillate said indicating member on its axis.

21. In an indicating instrument, an indicating member mounted to oscillate about an axis, an element associated with said indicating member and adapted to oscillate with said indicating member and to oscillate relative to said member, a pair of thermostatic devices adapted to move in response to changes of temperature, connections between said thermostatic devices and said element, said thermostatic devices each being operative to rotate said element in the same direction as a result of movement of the thermostatic devices in response to changes of temperature whereby moving effort by both of said devices operates to oscillate said element relative to said indicating member and whereby moving effort by one of said thermostatic devices operates to oscillate said indicating member on its axis.

22. In an indicating instrument, an indicating member mounted to oscillate about an axis, an element associated with said indicating member and adapted to oscillate with said member and to oscillate on an axis straight from the axis of said indicating member, a pair of thermostatic devices adapted to move in response to changes of temperature, connections between said thermostatic devices and said element, said thermostatic devices being operative to oscillate said element in the same direction as a result of movement of the thermostatic device in response to changes in temperature whereby moving effort by both of said thermostatic devices operates to oscillate said element relative to said indicating member and whereby moving effort by one of said thermostatic devices operates to oscillate said indicating member on its axis.

23. In a thermo-responsive instrument, a variably movable indicating element, a thermostatic device comprising an oscillatably mounted head, a pair of thermo-responsive elements rigidly connected at one portion to the head and having free portions spaced in different directions from the axis of oscillation, the free end of one thermo-responsive element movably engaging a stationary support, the free end of the other thermo-responsive element being connected to the movable indicating element, the said support engaging thermo-responsive element being adapted to rotate the head in response to changes of ambient temperature and in the direction to neutralize corresponding movement of the other thermo-responsive element tending to move the indicating element.

24. In an indicating instrument, an indicating element oscillatably mounted, an oscillatory element supported on the indicating element, a pair of thermostatic devices adapted to move in response to changes of ambient temperature, connections from the devices to the oscillatory element whereby they may transmit their movement thereto and to the indicating element whereby the devices may have their moving efforts mutually neutralized in response to changes of ambient temperature only, a heating element for one of the devices rendering it independently movable in response to variations of heating effect thereof to cause it to correspondingly variably move the oscillatory element and indicating element, an electric circuit for heating the heating element, a remotely situated controller in the circuit adapted to cause variable electric current from a suitable source to flow over the circuit to variably heat the heating element.

THEODORE J. SMULSKI.